United States Patent
Han (10) Patent No.: US 12,391,301 B2
(45) Date of Patent: Aug. 19, 2025

(54) RACK BAR SUPPORT DEVICE OF VEHICLE STEERING DEVICE

(71) Applicant: HL Mando Corporation, Pyeongtaek-si (KR)

(72) Inventor: Jeonghwa Han, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/590,071

(22) Filed: Feb. 28, 2024

(65) Prior Publication Data

US 2025/0128756 A1 Apr. 24, 2025

(30) Foreign Application Priority Data

Oct. 19, 2023 (KR) .................. 10-2023-0140422

(51) Int. Cl.
*B62D 3/10* (2006.01)
*B62D 3/12* (2006.01)
*B62D 7/22* (2006.01)

(52) U.S. Cl.
CPC ............. *B62D 3/123* (2013.01); *B62D 7/226* (2013.01)

(58) Field of Classification Search
CPC ........ B62D 3/123; B62D 7/226; B62D 11/00; B62D 7/163
See application file for complete search history.

(56) References Cited

U.S. PATENT DOCUMENTS

| | | | | |
|---|---|---|---|---|
| 6,067,713 A * | 5/2000 | Bugosh | ................. | B62D 3/123 29/505 |
| 6,286,382 B1 * | 9/2001 | Spagnuolo | ............. | B62D 3/123 470/1 |
| 7,281,444 B1 * | 10/2007 | Bishop | ................. | F16H 55/283 74/89.11 |
| 2002/0124670 A1 * | 9/2002 | Bugosh | ................. | F16H 55/283 74/498 |
| 2008/0034910 A1 * | 2/2008 | Roline | ................. | F16H 55/283 74/422 |
| 2017/0276236 A1 * | 9/2017 | Zhang | .................... | F16H 57/12 |

FOREIGN PATENT DOCUMENTS

| KR | 10-2013-0143275 A | | 12/2013 | |
|---|---|---|---|---|
| KR | 10-2014-0014711 A | | 2/2014 | |
| KR | 101427439 B1 | * | 8/2014 | |
| KR | 20170019930 A | * | 8/2014 | ............. B62D 3/123 |
| KR | 10-18838817 B1 | | 3/2018 | |

* cited by examiner

*Primary Examiner* — Zakaria Elahmadi
(74) *Attorney, Agent, or Firm* — Hauptman Ham, LLP (57) ABSTRACT

A rack bar support device of a vehicle steering device is provided to render the left/right supporting forces for the support yoke to support the rack bar when the rack bar slides left and right, prevent noise due to impact, reversely coming from the road surface or a gap increased by the wear of the support yoke, and provide a comfortable sense of steering to the driver during steering.

18 Claims, 11 Drawing Sheets

RACK BAR SUPPORT DEVICE OF VEHICLE STEERING DEVICE

CROSS-REFERENCE TO RELATED APPLICATION

This application claims priority from Korean Patent Application No. 10-2023-0140422, filed on Oct. 19, 2023, which is hereby incorporated by reference for all purposes as if fully set forth herein.

BACKGROUND

Field

The present embodiments relate to a rack bar support device of a vehicle steering device. More specifically, the present embodiments relate to a rack bar support device of a vehicle steering device, which may render the left/right supporting forces for the support yoke to support the rack bar when the rack bar slides left and right, prevent noise due to impact, reversely coming from the road surface or a gap increased by the wear of the support yoke, and provide a comfortable sense of steering to the driver during steering.

Description of Related Art

A steering device of a vehicle changes the traveling direction of the vehicle at the driver's will to assist the driver to drive the vehicle in the desired direction by arbitrarily changing the center of rotation around the front wheel.

The vehicle steering device includes, e.g., a pinion gear and a rack bar for converting the rotational force received from the steering shaft when the driver manipulates the steering wheel into linear motion and has a rack bar support device for supporting the rack bar toward the pinion gear to enable proper engagement between the rack bar and the pinion gear.

The conventional rack bar support device, however, suffers from deterioration of the driver's sense of steering due to a deviation between left and right supporting forces when the rack bar slides left and right and an increase in friction between the rack bar and the pinion gear.

Further, when the support yoke wears out to some degree, an imbalance may occur between the rack bar supporting forces, causing rattle noise in the support yoke and the yoke plug.

SUMMARY

Conceived in the foregoing background, the present embodiments may provide a rack bar support device of a vehicle steering device, which may render the left/right supporting forces for the support yoke to support the rack bar when the rack bar slides left and right, prevent noise due to impact, reversely coming from the road surface or a gap increased by the wear of the support yoke, and provide a comfortable sense of steering to the driver during steering.

The objects of embodiments of the disclosure are not limited to the foregoing and other objects will be apparent to one of ordinary skill in the art from the following detailed description.

According to the present embodiments, a rack bar support device of a vehicle steering device includes a support yoke including a front side configured to support a rack bar of the vehicle steering device and a rear side having a tapered recess formed in a center thereof, the support yoke being configured to be coupled to a mounting hole of a gear box housing. An inner circumferential surface of the tapered recess has a diameter decreasing toward the rack bar. The rack bar support device further includes a yoke plug including a supporting protrusion at a front side thereof to protrude toward the support yoke. The supporting protrusion supports the inner circumferential surface of the tapered recess to support the support yoke toward the rack bar and to cause the support yoke to be fixed in the mounting hole of the gear box housing.

According to the present embodiments, a rack bar support device of a vehicle steering device includes a support yoke including a front side configured to support a rack bar of the vehicle steering device and a rear side having a cylinder recess formed in a center thereof, the support yoke being configured to be coupled to a mounting hole of a gear box housing of the vehicle steering device. An inner circumferential surface of the cylinder recess has a uniform diameter. The rack bar support device further includes a yoke plug including a tapered protrusion at a front side thereof. A diameter of an outer circumferential surface of the tapered protrusion is decreased toward the rack bar. The tapered protrusion is supported on the inner circumferential surface of the cylinder recess to support the support yoke toward the rack bar and to cause the support yoke to be fixed in the mounting hole of the gear box housing.

According to the present embodiments, there may be provided a rack bar support device of a vehicle steering device, which may render the left/right supporting forces for the support yoke to support the rack bar when the rack bar slides left and right, prevent noise due to impact, reversely coming from the road surface or a gap increased by the wear of the support yoke, and provide a comfortable sense of steering to the driver during steering.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A) ", or" (B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
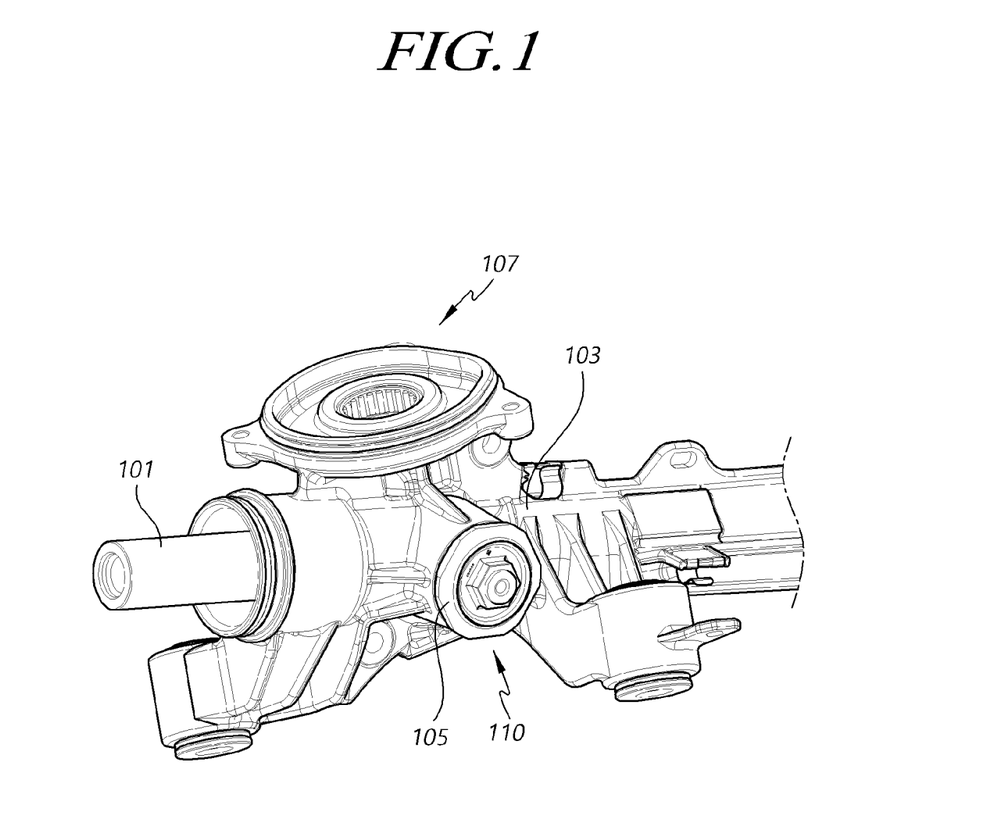
FIG. 1 is a perspective view illustrating a rack bar support device of a vehicle steering device according to the present embodiments.
Figure 2:
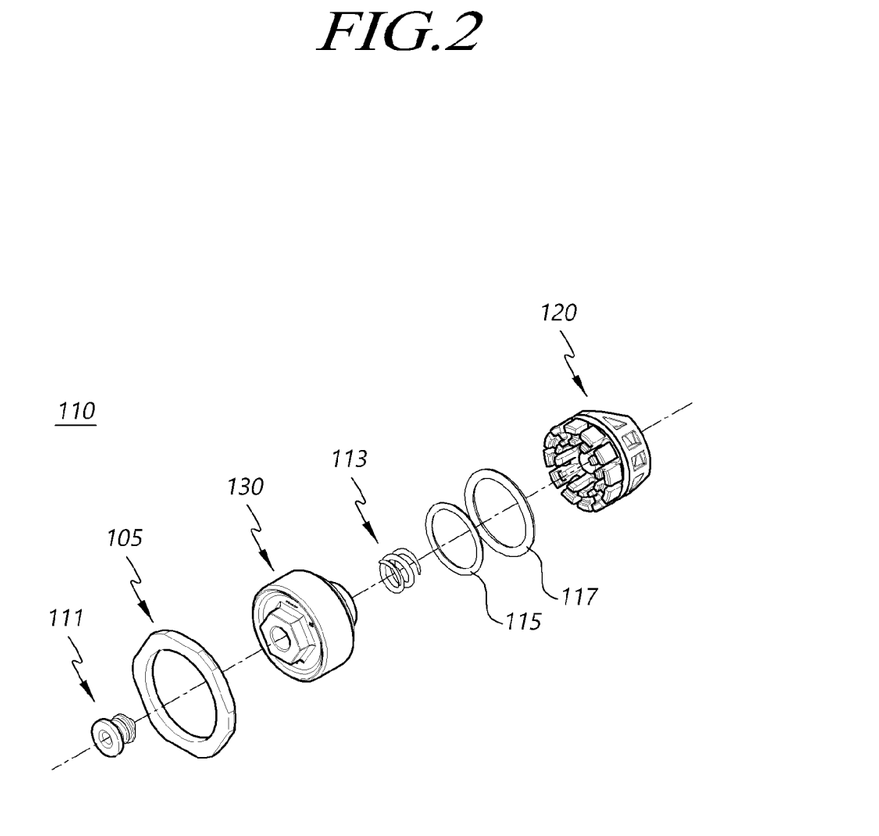
FIGS. 2 and 3 are exploded perspective views illustrating a rack bar support device of a vehicle steering device according to the present embodiments.
Figure 3:
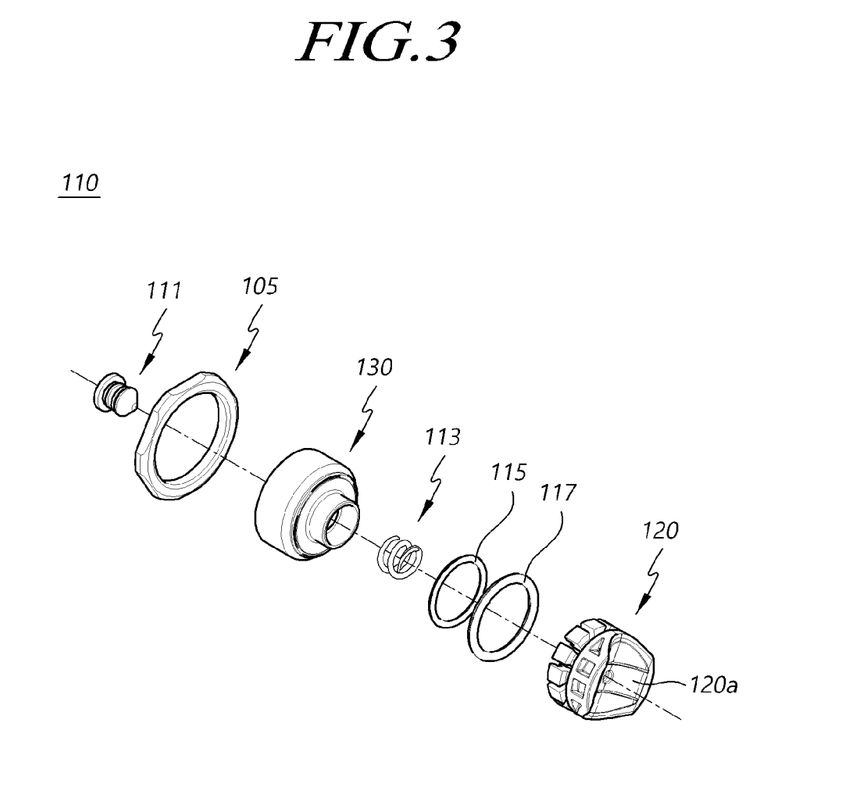
Figure 4:
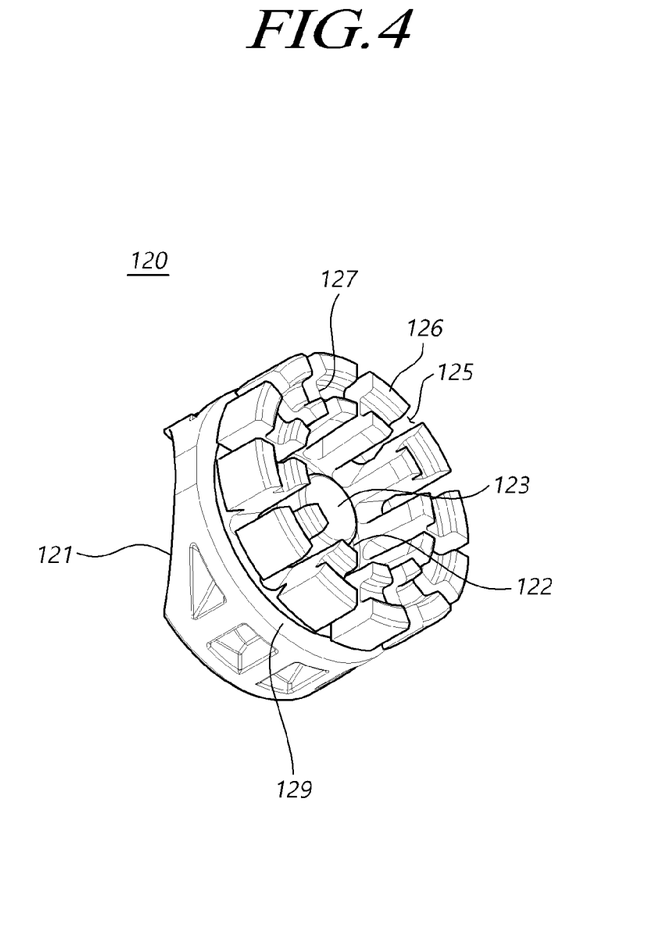
FIG. 4 is a perspective view illustrating a rack bar support device of a vehicle steering device according to the present embodiments.
Figure 5:
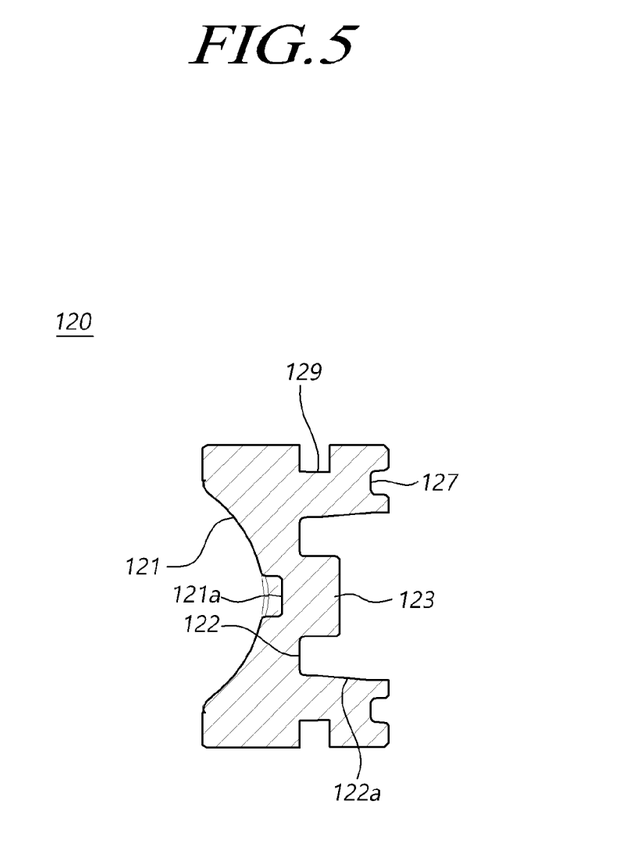
FIG. 5 is a cross-sectional view illustrating a rack bar support device of a vehicle steering device according to the present embodiments.
Figure 6:
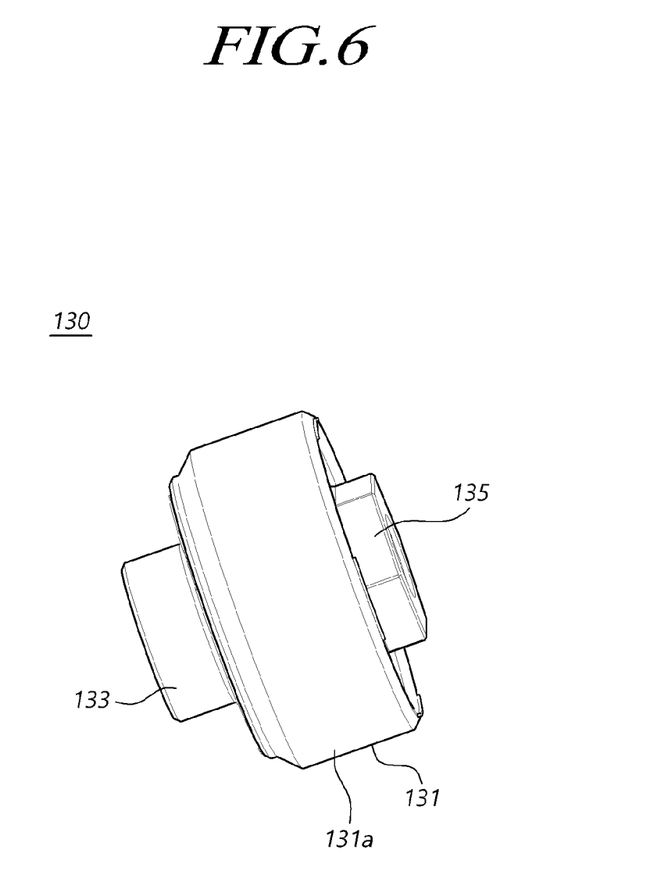
FIG. 6 is a perspective view illustrating a rack bar support device of a vehicle steering device according to the present embodiments.
Figure 7:
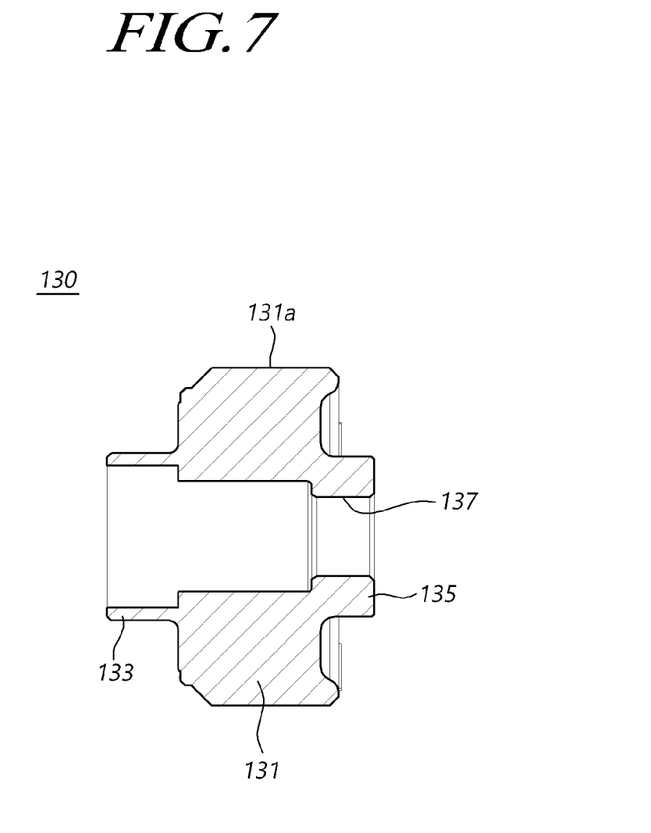
FIGS. 7, 8, 9, 10, and 11 are cross-sectional views illustrating a rack bar support device of a vehicle steering device according to the present embodiments.
Figure 8:
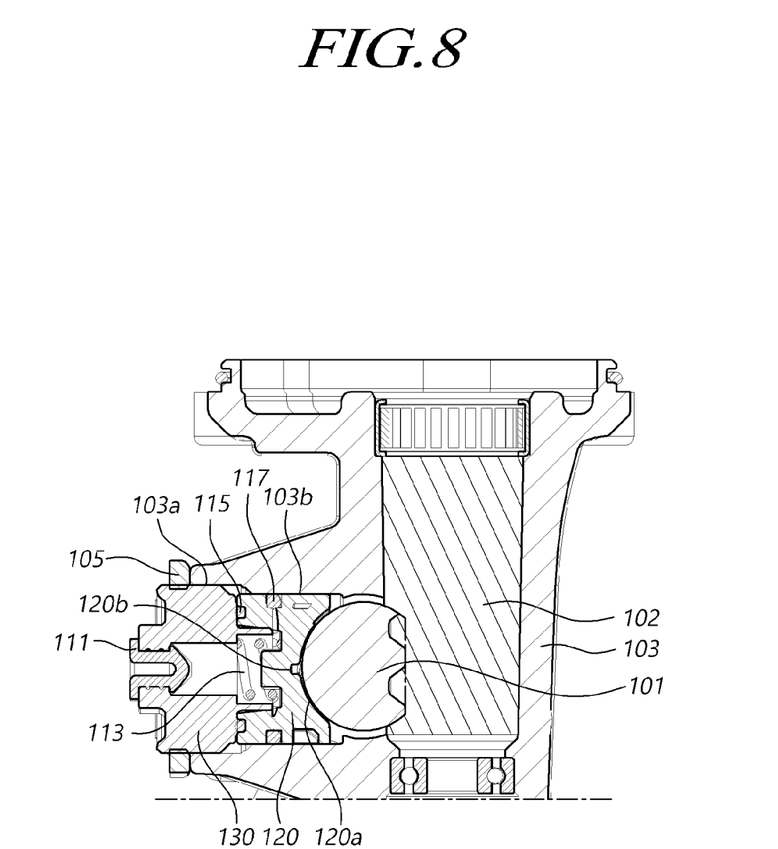

FIG. 1 is a perspective view illustrating a rack bar support device of a vehicle steering device according to the present embodiments. FIGS. 2 and 3 are exploded perspective views illustrating a rack bar support device of a vehicle steering device according to the present embodiments. FIG. 4 is a perspective view illustrating a rack bar support device of a vehicle steering device according to the present embodiments. FIG. 5 is a cross-sectional view illustrating a rack bar support device of a vehicle steering device according to the present embodiments. FIG. 6 is a perspective view illustrating a rack bar support device of a vehicle steering device according to the present embodiments. FIGS. 7, 8, 9, 10, and 11 are cross-sectional views illustrating a rack bar support device of a vehicle steering device according to the present embodiments.

Referring to FIGS. 1 to 8, a rack bar support device 110 of a vehicle steering device includes a support yoke 120 including a front side supporting a rack bar 101 and a rear side having a tapered recess 122 formed in a center thereof and coupled to a mounting hole 103a or 103b of a gear box housing 103, wherein an inner circumferential surface 122a of the tapered recess 122 has a diameter decreasing toward the rack bar 101. The rack bar support device 110 further includes a yoke plug 130 including a supporting protrusion 133 at a front side thereof to protrude toward the support yoke 120 to be supported on the inner circumferential surface of the tapered recess 122. The supporting protrusion 133 of the yoke plug 130 supports the support yoke 120 toward the rack bar 101 and causes the support yoke 120 to be fixed into the mounting hole 103a or 103b.

The vehicle steering device includes, e.g., a steering wheel placed in the driver's seat, a steering shaft connected to the steering wheel, a steering column for fixing the steering shaft to the vehicle body, a gear box housing 110 including a rack gear and a pinion gear 102 for converting the rotational force received from the steering shaft into linear motion, a rack bar 101 having inner ball joints at two opposite end portions thereof, and tie rods integrally formed with the inner ball joints.

The rack bar 101 is engaged with the pinion gear 102 to convert rotation into linear motion. The rack bar support device 110 is provided behind the rack bar 101 to support the rack bar 101 toward the pinion gear 102 so that the rack bar 101 and the pinion gear 102 are properly engaged with each other.

Hereinafter, unless specifically stated in connection to the description of directions, the direction from the rack bar 101 to the pinion gear 102 is referred to as forward, and the opposite direction is referred to as rearward.

The rack bar support device 110 has a structure that includes a support yoke 120, a yoke supporting member 113, and a yoke plug 130. The support yoke 120 is positioned behind the rack bar 101 and is inserted into the mounting hole 103a or 103b of the gear box housing 103 to be movable in front and rear directions perpendicular to the rack bar 101.

In the operation of the vehicle steering device, if the driver manipulates the steering wheel, the steering shaft 105 connected with the steering wheel is rotated, allowing the pinion gear 102 connected to a lower end of the steering shaft to drive the rack bar 101.

The gear box housing 103 is hollow to receive the rack bar 101 and, on one side thereof, an assembly portion 107 for assembling the pinion gear 102 is formed with the mounting hole 103a or 103b for mounting the rack bar support device 110 supporting the rack bar 101 toward the pinion gear 102.

The rack bar 101 is engaged with the pinion gear 102 to convert the rotation of the steering shaft 105 into linear motion. The rack bar support device 110 is provided behind the rack bar 101 to support the rack bar 101 toward the pinion gear 102 so that the rack bar 101 and the pinion gear 102 are properly engaged with each other.

The rack bar support device 110 absorbs the vibration and impact transferred from the road surface when the vehicle travels in the rack-pinion steering device and properly maintains engagement between the rack bar 101 and the pinion gear 102.

Accordingly, it is possible to reduce rattle noise due to collision between the support yoke 120 and the gear box housing 103.

In the present embodiments, the rack bar support device 110 includes the support yoke 120 and the yoke plug 130.

The rack bar support device 110 may further include a yoke supporting member 113 that is coupled to the tapered recess 122 provided in the support yoke 120 to elastically support the rear side of the support yoke 120 away from the front side of the yoke plug 130.

The support yoke 120 is coupled to the mounting hole 103a or 103b of the gear box housing 103. The support yoke 120 has a front side supporting the rack bar 101. The tapered recess 122 whose inner circumferential surface has a diameter decreasing toward the rack bar 101 is provided in the center of the rear side of the support yoke 120.

The front side of the support yoke 120 has a rack bar supporting surface 121 that is formed as a semi-circular or arc-shaped recess to come in tight contact with the rear surface of the rack bar 101. The support yoke 120 further has a yoke sheet 120a on its front surface to reduce friction with the rear surface of the rack bar 101 and is coupled to the mounting hole 103a or 103b of the gear box housing 103.

The yoke sheet 120a has a coupling protrusion 120b on its rear surface to couple to the coupling recess 121a formed in the rack bar supporting surface 121 of the support yoke 120.

The front side of the yoke plug 130 has a supporting protrusion 133 that protrudes toward the support yoke 120 to be supported on the inner circumferential surface 122a of the tapered recess 122 and is fixed to the mounting hole 103a or 103b while supporting the support yoke 120 toward the rack bar 101.

The rack bar support device 110 may further include a lock nut 105 provided on the outer circumferential surface of the yoke plug 130. The yoke plug 130 has a threaded portion 131a on the outer circumferential surface thereof to be screwed to the mounting hole 103a or 103b of the gear box housing 103 and is fixed while being prevented from being released by the lock nut 105 outside the gear box housing 103.

The rack bar support device 110 may further include a plug 111. Further, the yoke plug 130 has a tool fastening portion 135 on the rear side thereof to allow easier assembly. The plug 111 is coupled to a through hole 137 formed in the tool fastening portion 135 to prevent entrance of dust or moisture from the outside.

The supporting protrusion 133 provided on the front side of the yoke plug 130 is inserted into the tapered recess 122 and is in contact with the inclined surface of the tapered recess 122 to elastically deform the support yoke 120 radially outward such that the support yoke 120 tightly contacts the inner circumferential surface of the mounting hole 103a or 103b of the gear box housing 103.

Accordingly, although impact is transferred from the road surface, it is possible to reduce rattle noise due to collision between the support yoke 120 and the gear box housing 103.

The yoke supporting member 113 coupled to the tapered recess 122 of the support yoke 120 elastically supports the rear side of the support yoke 120 away from the front side of the yoke plug 130, thereby supporting the rack bar 101 toward the pinion gear 102 to achieve proper engagement between the rack bar 101 and the pinion gear 102.

The yoke supporting member 113 is elastically compressed and mounted in the tapered recess 122 formed in the center of the rear side of the support yoke 120. In the present embodiments, an example in which the yoke supporting member 113 is a coil spring is shown.

The support yoke 120 is formed of a material capable of absorbing vibration and noise with a predetermined level of elasticity and rigidity. Thus, the support yoke 120 is formed of an elastic material such as engineering plastic with such properties.

The support yoke 120 has a protruding end portion 123 that protrudes toward the yoke plug 130 on the bottom surface of the tapered recess 122 provided on the rear side. The protruding end portion 123 is formed in a pillar shape spaced apart from the inner circumferential surface 122a of the tapered recess 122.

The inner circumferential surface of the yoke supporting member 113 is supported on the outer circumferential side of the protruding end portion 123, and the outer circumferential surface of the yoke supporting member 113 is spaced apart from the inner circumferential surface of the supporting protrusion 133 provided in the yoke plug 130.

Accordingly, as the position of the yoke supporting member 113 is fixed by the protruding end portion 123, rattle noise due to collision with the inner circumferential surface of the supporting protrusion 133 is prevented.

The rack bar support device 110 may further include a plug supporting member 115. A seating groove 127, which is an annular seating groove, is provided in the rear side of the support yoke 120, between the outer circumferential surface of the support yoke 120 and the inner circumferential surface of the tapered recess 122. The plug supporting member 115 is coupled to the seating groove 127 to elastically support the yoke plug 130.

The plug supporting member 115 damps the impact transferred from the road surface through the rack bar 101 while preventing rattle noise due to collision between the support yoke 120 and the yoke plug 130.

The support yoke 120 has a cutout portion 125 cut from the outer circumferential surface to the inner circumferential surface of the tapered recess 122. A plurality of cutout portions 125 may be formed by cutting radially from the center of the support yoke 120.

Therefore, when the supporting protrusion 133 of the yoke plug 130 is mounted while supporting the inner circumferential surface of the tapered recess 122, separated protrusions 126 separated by the cutout portions 125 may be easily elastically deformed in the radial direction and the circumferential direction.

The cutout portions 125 may have the same cut width along the circumferential direction, so that deformation of the separated protrusions 126 in the circumferential direction and the radial direction may be more uniformly achieved.

The rack bar support device 110 may further include a housing supporting member 117. An outer circumferential groove 129 is provided in the outer circumferential surface of the support yoke 120 in the circumferential direction to communicate with the cutout portions 125. The housing supporting member 117 is coupled to the outer circumferential groove 129 to elastically support the inner circumferential surface of the mounting hole 103a or 103b of the gear box housing 103.

Accordingly, when impact is transferred from the road surface, the housing supporting member 117 may reduce rattle noise due to collision between the support yoke 120 and the gear box housing 103.

Further, if a gap occurs between the support yoke 120 and the rack bar 101 due to wear, it is possible to prevent rattle noise due to collision between the support yoke 120 and the gear box housing 103 by increasing the mounting depth of the yoke plug 130.

Figure 9:
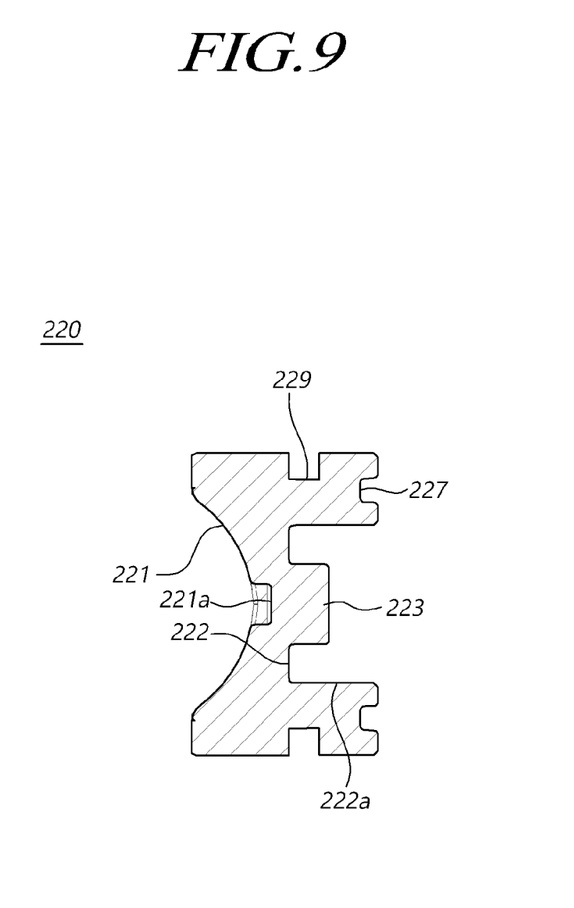
Figure 10:
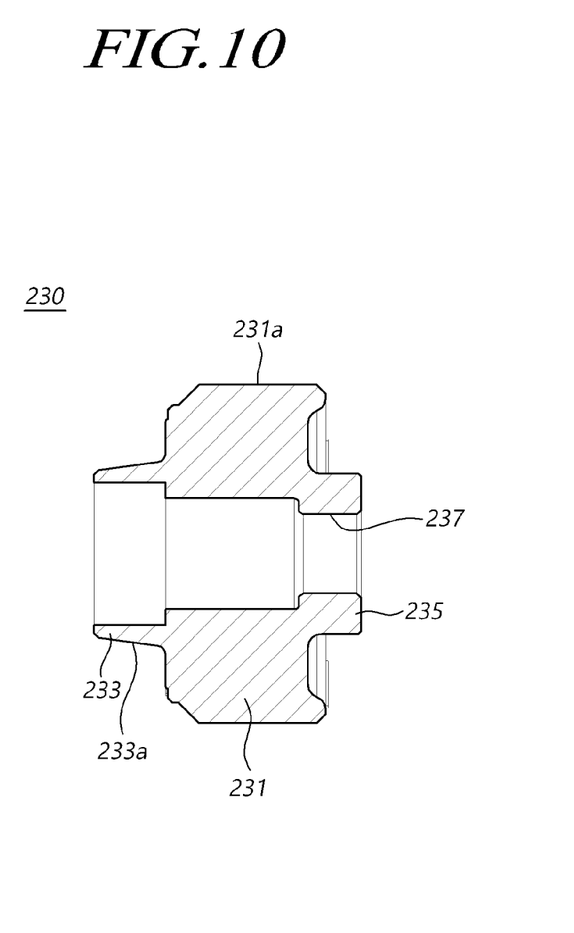
Figure 11:
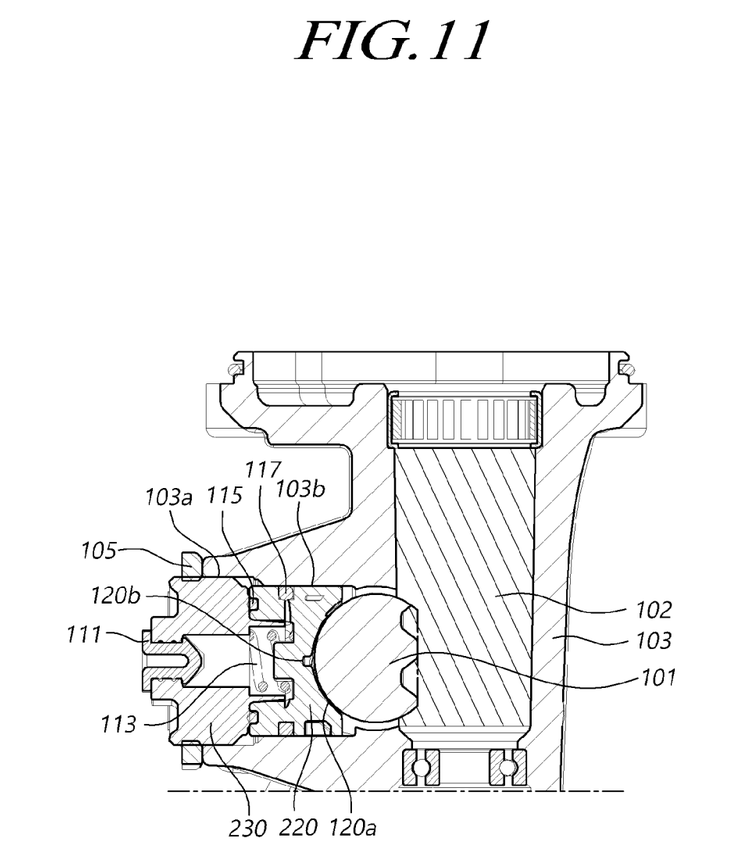

Referring to FIGS. 9 to 11 together with FIGS. 1 to 8, a rack bar support device 110 of a vehicle steering device according to the disclosure includes a support yoke 220 including a front side supporting a rack bar 101 and a rear side having a cylinder recess 222 formed in a center thereof. The cylinder recess 222 has a uniform diameter defined by an inner circumferential surface 222a of the cylinder recess 222. The support yoke 220 is coupled to a mounting hole 103a or 103b of a gear box housing 103. The rack bar support device 110 further includes a yoke plug 230 including a tapered protrusion 233 at a front side thereof. A diameter of an outer circumferential surface of the tapered protrusion 233 is decreased toward the rack bar 101. The tapered protrusion 233 of the yoke plug 230 is inserted into the cylinder recess 222 of the support yoke 220 such that the support yoke 220 is supported by the yoke plug 230 toward the rack bar 101 and fixed into the mounting hole 103a or 103b.

The other components than the cylinder recess 222 of the support yoke 220 and the tapered protrusion 233 of the yoke plug 230 are identical as those shown in FIGS. 1 to 8, and the following description thus focuses primarily on the differences without a detailed description.

As shown in FIGS. 9 and 11, a cylinder recess 222 having the uniform diameter of the inner circumferential surface 222a is provided in the center of the rear side of the support yoke 220.

As shown in FIGS. 10 and 11, a tapered protrusion 233, which protrudes while decreasing in the diameter of the outer circumferential surface toward the rack bar 101, is provided on the front side of the yoke plug 230.

The outer circumferential surface of the tapered protrusion 233 provided on the front side of the yoke plug 230 is an inclined surface so that the tapered protrusion 233 is mounted while supporting the inner circumferential surface 222a of the cylinder recess 222 which has the uniform diameter.

When the tapered protrusion 233 is inserted into the cylinder recess 222, the support yoke 220 is elastically deformed radially outward, and is thus brought in tight contact with the inner circumferential surface of the mounting hole 103a or 103b of the gear box housing 103.

Accordingly, when impact is transferred from the road surface, it is possible to reduce rattle noise due to collision between the support yoke 220 and the gear box housing 103.

Further, if a gap occurs between the support yoke 220 and the rack bar 101 due to wear, it is possible to prevent rattle noise due to collision between the support yoke 220 and the gear box housing 103 by increasing the mounting depth of the yoke plug 230.

The front side of the support yoke 220 has a rack bar supporting surface 221 that is formed as a semi-circular or arc-shaped recess to come in tight contact with the rear surface of the rack bar 101. The support yoke 220 further has a yoke sheet 120a on its front surface to reduce friction with the rack bar 101 and is coupled to the mounting hole 103a or 103b of the gear box housing 103.

The yoke sheet 120a has a coupling protrusion 120b on its rear surface to couple to the coupling recess 221a formed in the rack bar supporting surface 221 of the support yoke 220.

The yoke plug 230 has a threaded portion 231a on the outer circumferential surface thereof to be screwed to the mounting hole 103a or 103b of the gear box housing 103 and is fixed while being prevented from being released by the lock nut 105 outside the gear box housing 103.

The yoke supporting member 113 coupled to the cylinder recess 222 of the support yoke 220 elastically supports the rear side of the support yoke 220 away from the front side of the yoke plug 230, thereby supporting the rack bar 101 toward the pinion gear 102 to achieve proper engagement between the rack bar 101 and the pinion gear 102.

The support yoke 220 has a protruding end portion 223 that protrudes toward the yoke plug 230 on the bottom surface of the cylinder recess 222 provided on the rear side. The protruding end portion 223 is formed in a pillar shape spaced apart from the inner circumferential surface 222a of the cylinder recess 222.

The inner circumferential surface of the yoke supporting member 113 is supported on the outer circumferential side of the protruding end portion 223, and the outer circumferential surface of the yoke supporting member 113 is spaced apart from the inner circumferential surface of the tapered protrusion 233 provided in the yoke plug 230.

Accordingly, as the position of the yoke supporting member 113 is fixed by the protruding end portion 223, rattle noise due to collision with the inner circumferential surface of the tapered protrusion 233 is prevented.

A seating groove 227, which is an annular seating groove, is provided in the rear side of the support yoke 220, between the outer circumferential surface of the support yoke 220 and the inner circumferential surface of the cylinder recess 222. A plug supporting member 115 is coupled to the seating groove 227 to elastically support the yoke plug 230.

The plug supporting member 115 damps the impact transferred from the road surface through the rack bar 101 while preventing rattle noise due to collision between the support yoke 220 and the yoke plug 230.

The support yoke 220 has a cutout portion 125 cut from the outer circumferential surface to the inner circumferential surface of the cylinder recess 222. A plurality of cutout portions 125 may be formed by cutting radially from the center of the support yoke 220.

The cutout portions 125 may have the same cut width along the circumferential direction, so that deformation of the separated protrusions 126 in the circumferential direction and the radial direction may be more uniformly achieved.

An outer circumferential groove 229 is provided in the outer circumferential surface of the support yoke 220 in the circumferential direction to communicate with the cutout portions 125, and a housing supporting member 117 is coupled to the outer circumferential groove 229 to elastically support the inner circumferential surface of the mounting hole 103a or 103b of the gear box housing 103.

According to the present embodiments having the above-described structure and shape, it is possible to render the left/right supporting forces for the support yoke to support the rack bar when the rack bar slides left and right, prevent noise due to impact, reversely coming from the road surface or a gap increased by the wear of the support yoke, and provide a comfortable sense of steering to the driver during steering.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A rack bar support device of a vehicle steering device, the rack bar support device comprising:
   a support yoke including a front side configured to support a rack bar of the vehicle steering device and a rear side having a tapered recess formed in a center thereof, the support yoke being configured to be coupled to a mounting hole of a gear box housing of the vehicle steering device, wherein an inner circumferential surface of the tapered recess has a diameter decreasing toward the rack bar; and
   a yoke plug including a supporting protrusion at a front side thereof to protrude toward the support yoke, wherein the supporting protrusion supports the inner circumferential surface of the tapered recess to support the support yoke toward the rack bar and to cause the support yoke to be fixed in the mounting hole of the gear box housing,
   wherein the support yoke includes a cutout portion cut from an outer circumferential surface of the support yoke to the inner circumferential surface of the tapered recess.

2. The rack bar support device of claim 1, further comprising a yoke supporting member coupled to the tapered recess of the support yoke to elastically support the rear side of the support yoke away from the front side of the yoke plug.

3. The rack bar support device of claim 2, wherein the support yoke includes a protruding end portion protruding toward the yoke plug on a bottom surface of the tapered recess.

4. The rack bar support device of claim 3, wherein the yoke supporting member has
   an inner circumferential surface supported on an outer circumferential side of the protruding end portion and
   an outer circumferential surface spaced apart from an inner circumferential surface of the supporting protrusion.

5. The rack bar support device of claim 1, wherein the rear side of the support yoke includes an annular seating groove between the outer circumferential surface of the support yoke and the inner circumferential surface of the tapered recess, and wherein the rack bar support device further comprises a plug supporting member coupled to the annular seating groove to elastically support the yoke plug.

6. A rack bar support device of a vehicle steering device, the rack bar support device comprising:
   a support yoke including a front side configured to support a rack bar of the vehicle steering device and a rear side having a tapered recess formed in a center thereof, the support yoke being configured to be coupled to a mounting hole of a gear box housing of the vehicle steering device, wherein an inner circumferential surface of the tapered recess has a diameter decreasing toward the rack bar; and
   a yoke plug including a supporting protrusion at a front side thereof to protrude toward the support yoke, wherein the supporting protrusion supports the inner circumferential surface of the tapered recess to support the support yoke toward the rack bar and to cause the support yoke to be fixed in the mounting hole of the gear box housing,
   wherein the support yoke includes a plurality of cutout portions cut radially from a center of the support yoke, each of the plurality of cutout portions being cut from an outer circumferential surface of the support yoke to the inner circumferential surface of the tapered recess.

7. The rack bar support device of claim 6, wherein the plurality of cutout portions has a same cut width in a circumferential direction of the support yoke.

8. The rack bar support device of claim 1, wherein the support yoke includes an outer circumferential groove extending in a circumferential direction of the support yoke, and the outer circumferential groove is provided in the outer circumferential surface of the support yoke to communicate with the cutout portion.

9. The rack bar support device of claim 8, wherein a housing supporting member is coupled to the outer circumferential groove to elastically support an inner circumferential surface of the mounting hole of the gear box housing.

10. A rack bar support device of a vehicle steering device, the rack bar support device comprising:
    a support yoke including a front side configured to support a rack bar of the vehicle steering device and a rear side having a cylinder recess formed in a center thereof, the support yoke being configured to be coupled to a mounting hole of a gear box housing of the vehicle steering device, wherein an inner circumferential surface of the cylinder recess has a uniform diameter; and
    a yoke plug including a tapered protrusion at a front side thereof, a diameter of an outer circumferential surface of the tapered protrusion being decreased toward the rack bar, the tapered protrusion being supported on the inner circumferential surface of the cylinder recess to support the support yoke toward the rack bar and to cause the support yoke to be fixed in the mounting hole of the gear box housing,
    wherein the support yoke includes a cutout portion cut from an outer circumferential surface of the support yoke to the inner circumferential surface of the cylinder recess.

11. The rack bar support device of claim 10, further comprising a yoke supporting member coupled to the cylinder recess of the support yoke to elastically support the rear side of the support yoke away from the front side of and the yoke plug.

12. The rack bar support device of claim 11, wherein the support yoke includes a protruding end portion protruding toward the yoke plug on a bottom surface of the cylinder recess.

13. The rack bar support device of claim 12, wherein the yoke supporting member has
    an inner circumferential surface supported on an outer circumferential side of the protruding end portion and
    an outer circumferential surface spaced apart from an inner circumferential surface of the tapered protrusion.

14. The rack bar support device of claim 10, wherein the rear side of the support yoke includes an annular seating groove between the outer circumferential surface of the support yoke and the inner circumferential surface of the cylinder recess, and wherein the rack bar support device further comprises a plug supporting member coupled to the annular seating groove to elastically support the yoke plug.

15. A rack bar support device of a vehicle steering device, the rack bar support device comprising:
    a support yoke including a front side configured to support a rack bar of the vehicle steering device and a rear side having a cylinder recess formed in a center thereof, the support yoke being configured to be coupled to a mounting hole of a gear box housing of the vehicle steering device, wherein an inner circumferential surface of the cylinder recess has a uniform diameter; and a yoke plug including a tapered protrusion at a front side thereof, a diameter of an outer circumferential surface of the tapered protrusion being decreased toward the rack bar, the tapered protrusion being supported on the inner circumferential surface of the cylinder recess to support the support yoke toward the rack bar and to cause the support yoke to be fixed in the mounting hole of the gear box housing, wherein the support yoke includes a plurality of cutout portions cut radially from a center of the support yoke, each of the plurality of cutout portions being cut from an outer circumferential surface of the support yoke to the inner circumferential surface of the cylinder recess.

16. The rack bar support device of claim 15, wherein the plurality of cutout portions has a same cut width in a circumferential direction of the support yoke.

17. The rack bar support device of claim 10, wherein the support yoke includes an outer circumferential groove extending in a circumferential direction of the support yoke, and the outer circumferential groove is provided in the outer circumferential surface of the support yoke to communicate with the cutout portion.

18. The rack bar support device of claim 17, wherein a housing supporting member is coupled to the outer circumferential groove to elastically support an inner circumferential surface of the mounting hole of the gear box housing.

* * * * *